United States Patent Office 3,448,677
Patented June 10, 1969

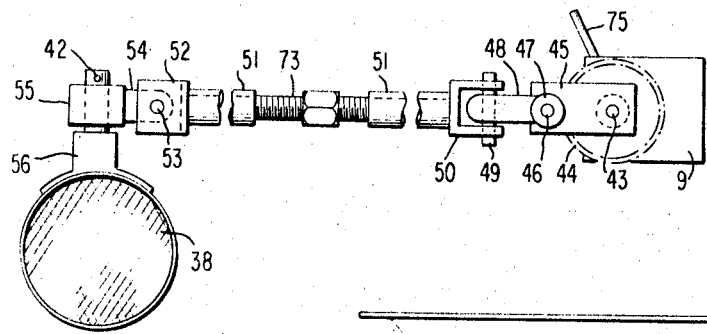
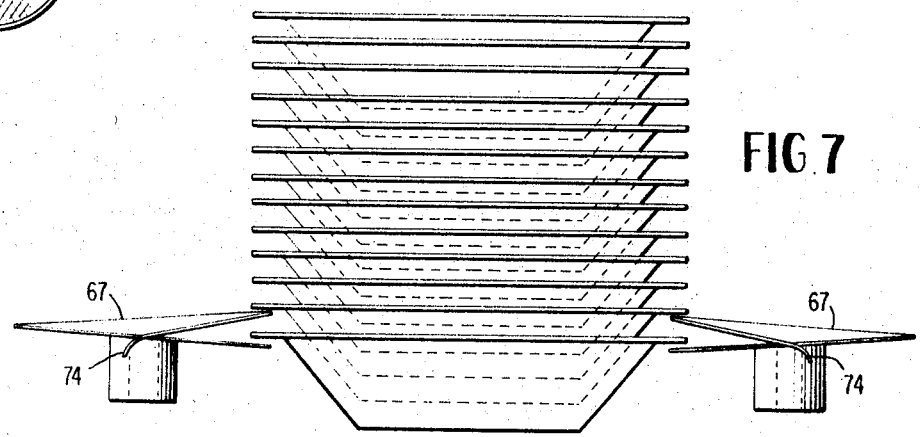
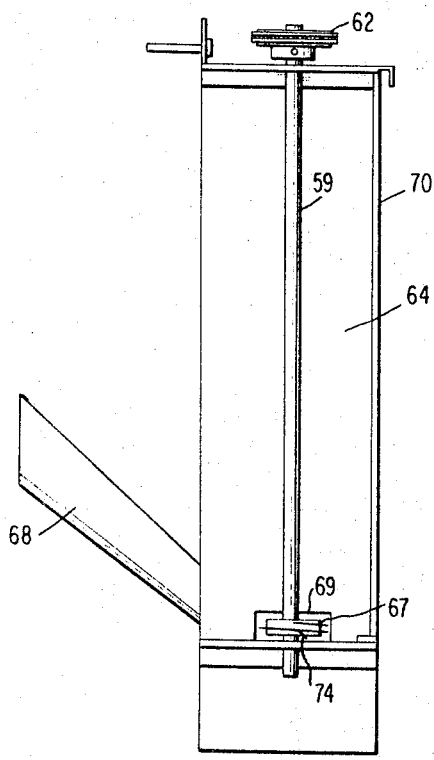

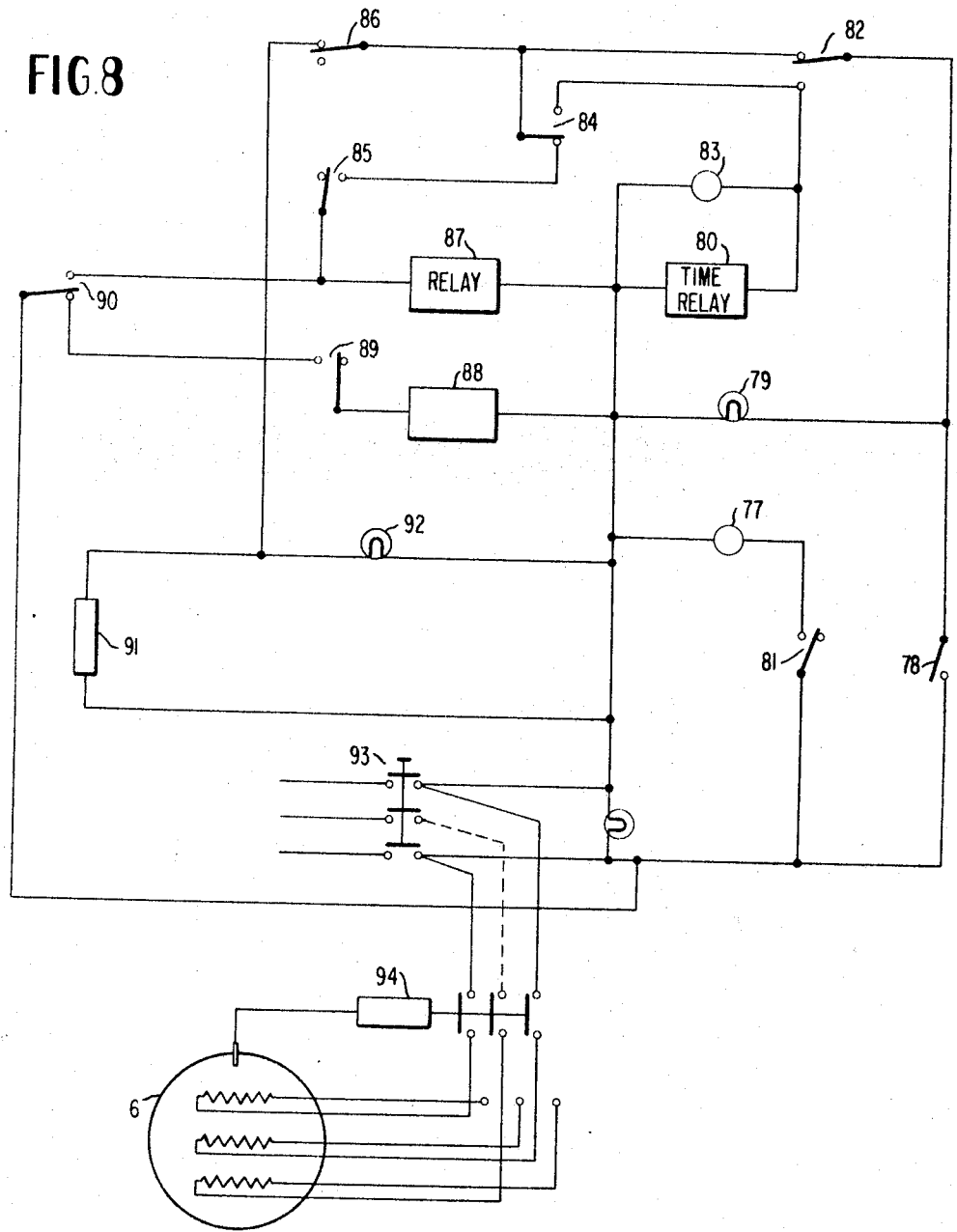

3,448,677
AUTOMATIC MACHINE FOR SELLING
FRIED FOODS
Johan Wilhelm Dexters, Overpelt, Belgium, assignor to
Dex-O-Mat, Brussels, Belgium, a Belgian body corporate
Filed Mar. 7, 1967, Ser. No. 621,182
Claims priority, application Belgium, Mar. 9, 1966,
677,557; Mar. 1, 1967, 40,431
Int. Cl. G01g 13/02; A47j 27/00, 37/12
U.S. Cl. 99—336                    9 Claims

ABSTRACT OF THE DISCLOSURE

An automatic machine for selling fried foods is coin operated. Upon insertion of the correct coinage, a screw turns to discharge food to be fried from a storage hopper onto a tray. The tray is balanced to tilt when it receives the proper weight of food, and tilting of the tray stops the feeding from the hopper. When the tray tilts, it discharges food into a basket immersed in hot cooking oil, and also starts a timer running. When the time has run, a motor starts that dispenses a container for the food and then tilts the basket to discharge the fried food into the container.

---

This invention relates to an automatic machine for selling fried foods, which comprises a frying pan, a coin-operated switch and means which are controlled by the coin-operated switch and which discharge a portion of foods to be fried into the pan, take it out of the pan and direct it towards a compartment.

In a known automatic machine, of the same kind, which is used for cooking and selling fried potatoes, the portions are arranged separately in groups. Each time the automatic machine is operated by introducing a coin, a portion which has been introduced, is fried and brought to a distributing compartment. In this known automatic machine, the portions have to be arranged separately by hand into the groups, which requires much work and time.

The invention has for its purpose to obviate this drawback and to provide an automatic machine for selling fried foods in which said food products are introduced in the machine without being subdivided and the machine performs by itself the division into portions.

For this purpose, the automatic machine according to the invention comprises a supply tank which is closed by a distributor device controlled by the coin-operated switch.

Advantageously, the supply tank has in the lower part thereof an opening which is closed by a fast-pitch worm.

In a particular embodiment of the invention, at least the lower end of the supply tank is funnel-shaped.

Advantageously, the supply tank axis coincides with the worm axis.

Preferably, the worm is adjustable in height on a shaft which is mounted adjacent to the supply tank.

In a very particular embodiment of the invention, under the supply tank but above the frying pan is mounted a tray which is swingable with respect to a frame adjacent to which is also mounted the supply tank and which forms a unit together with a counterweight.

In a particular embodiment of the invention, the counterweight is adjustable.

In an advantageous embodiment of the invention, the tray bears a tube which is closed at both ends and inside which is arranged a free weight.

In an efficient embodiment of the invention, the weight is a ball.

In a very particular embodiment of the invention, the automatic machine comprises a sieve which is connected through a mechanical drive to a motor which is controlled by the coin-operated switch, the whole being so arranged that the sieve lies in one position underneath the supply tank and inside the frying pan and, in another position, opens through the outlet thereof on a discharge plate.

In a preferred embodiment, means are provided to heat the discharge plate.

In a very advantageous embodiment of the invention, the sieve is hinged relative to the frame and it is connected by a link to a pin of a crank driven by a motor.

In another very advantageous embodiment of the invention, the link length is adjustable.

In a particular embodiment of the invention, the link is connected both to the crank and to the sieve through two couplings arranged at a right angle to one another.

In a very efficient embodiment of the invention, the automatic machine comprises an apparatus which is controlled by the coin-operated switch and which brings small cartons into the position where they are supplied with the fried foods for their distribution in the compartment.

In a particularly advantageous embodiment of the invention, said last apparatus is comprised of at least one worm which is located against the lower end of a vertical storage chamber for the cartons, at least one turn of the worm passing between two cartons and supporting a depending opposing element.

Preferably, on either side of the storage room is located a worm-screw drive.

Other details and features of the invention will become apparent from the description given below, by way of non-limitative example and with reference to the accompanying drawings, in which:

FIGURE 5 is a plan view of part of the automatic machine of FIGURE 1.

FIGURE 6 is a side view of part of the automatic machine shown in FIGURE 1.

FIG. 7 is an enlarged fragmentary elevational view showing a stack of cartons and the means for dispensing them one by one.

FIG. 8 is a simplified circuit diagram of the machine.

In the various figures, the same reference numerals pertain to similar elements.

Figure 1:
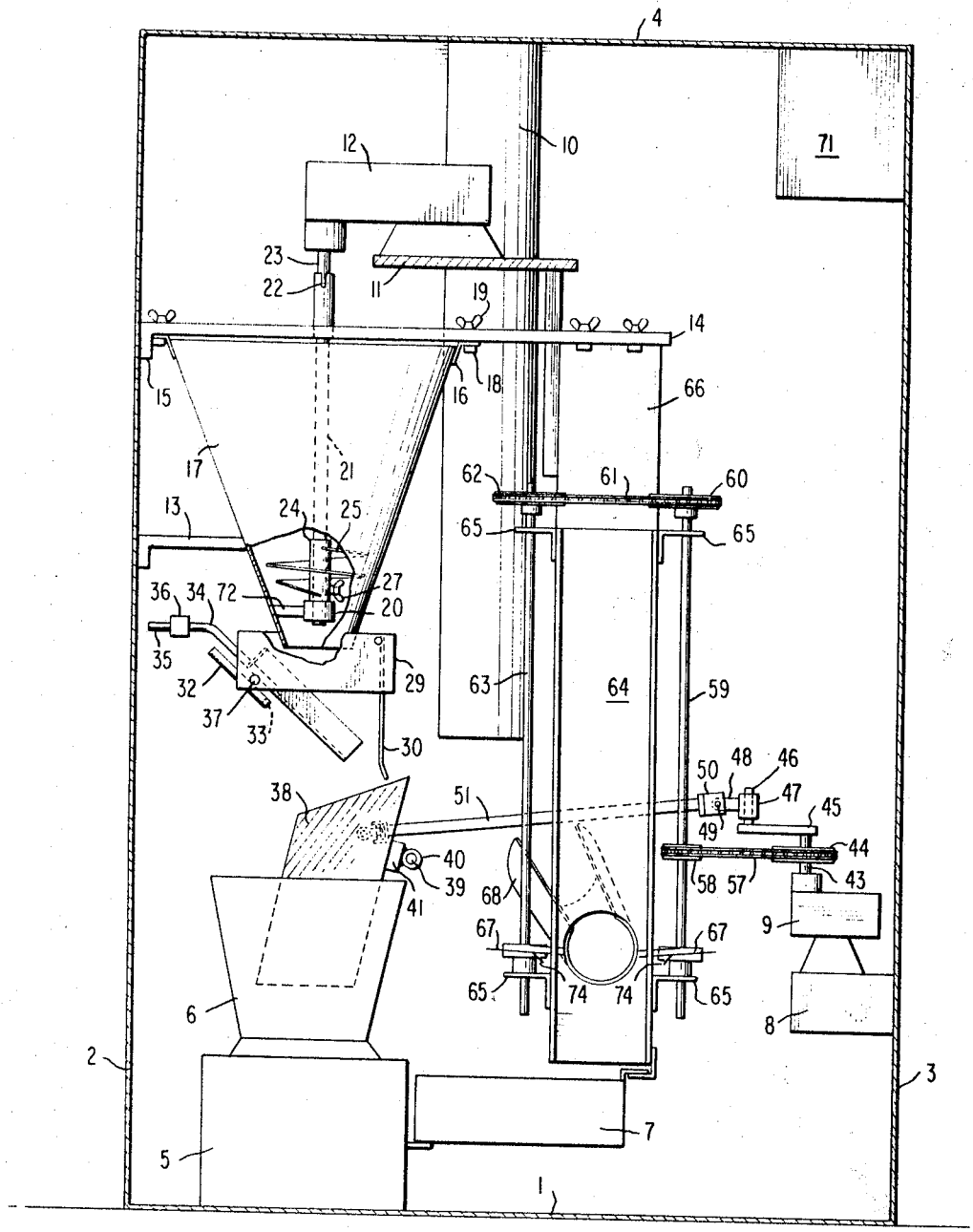
FIGURE 1 is a front view of an automatic machine for selling fried foods, according to the invention and with the cover plate removed.
Figure 2:
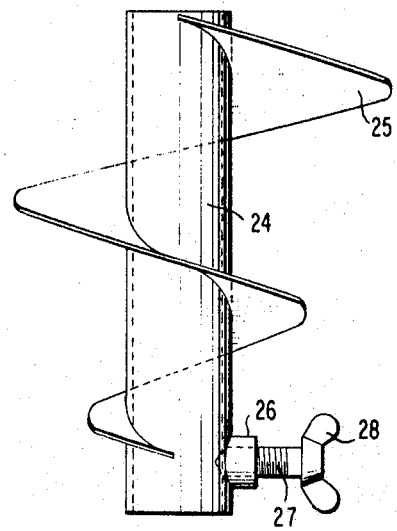
FIGURE 2 shows, on a larger scale, the worm-screw of the automatic machine of FIGURE 1.

The automatic machine shown in these figures has for its purpose the cooking and the automatic selling of fried potatoes. The machine is mounted inside a chamber with a bottom 1, four upward walls, among which the walls 2 and 3 have been shown, and a top plate 4. On the bottom 1 of the chamber is supported the base 5 which bears the frying pan 6. To said base 5 is also connected a refuse receiver 7; said refuse receiver is supported on the other hand by the carton storage container 64.

The support 8 for the motor 9 is mounted against the upstanding wall 3. A small cabinet 71 is mounted against this same upstanding wall 3 under the top plate 4 of the chamber. This small cabinet encloses the relays which are to control the operation of the motors 9 and 12 and the heating of the frying pan 6 and of the discharge plate 68.

A discharge pipe 10 to exhaust fumes opens into an outlet provided in the top plate 4.

Between the front and back walls of the chamber is mounted the supporting part 11. The motor 12 rests on this supporting part 11. The supply tank 17 which is to receive the fried potatoes to be cooked, is supported by the bearing arm 13 and by the attachment batten 14 which are connected to the upstanding wall 2 of the chamber. The attachment batten 14 is attached against said upstanding wall 2 through a part 15, which is bent at a right angle. The supply tank 17 is of conical shape and has its smallest opening in the lower part. The supply tank is provided on the outside with two handles 16 which are attached by means of bolts 18 and wing nuts 19 on the lower part of the attachment batten 14. On the inner part of the supply tank 17 is fixed, through a small arm 72, a guide block 20. In this guide block 20 lies the lower end of the shaft 21 in which is cut, on the upper part, a groove 22 inside which is engaged the end of shaft 23 of the motor 12. When the shaft 23 of the motor 12 rotates, the shaft 21 of the supply tank 17 is thus driven. On the lower part of the supply tank 17 is mounted, on the shaft 21, a wormscrew or screw conveyor with a hub 24 and a blade 25. To the hub 24 is soldered a nut 26 about an opening. In this nut is screwed a bolt 27 with wing head 28. By screwing the bolt down in the nut 26 and into the opening surrounded thereby, the worm is fixed on the shaft 21. By means of the rotation of the shaft 21 and thus of the worm-screw with the blade 25, the fried potatoes to be cooked are brought downwards from the supply tank 17, through the opening provided in the lower part of the supply tank.

Figure 3:
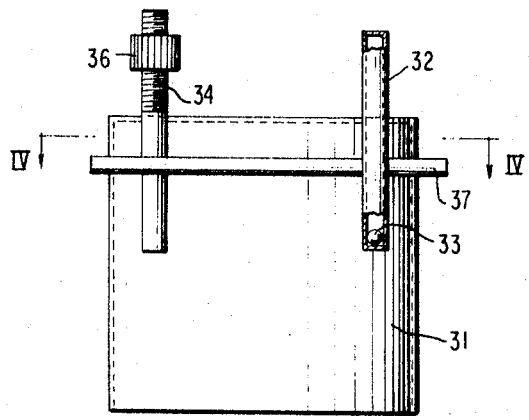
FIGURE 3 is a bottom view of part of the automatic machine of FIGURE 1.
Figure 4:
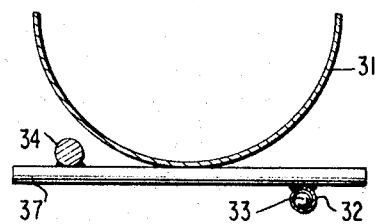
FIGURE 4 is a view in section along line IV—IV of FIGURE 3.

The supports 29 are located on the lower part of the supply tank 17. In these supports is mounted a shaft 37. Said shaft is integral with the tray 31 to which are attached, as shown more clearly in FIGURES 3 and 4, the tube 32 and the arm 34. The tube 32 is closed at both ends thereof. Inside this tube, a ball 33 is movable lengthwise, with an alternating motion, as far as to engage the ends. The arm 34 has a bent end 35 which is threaded and over which is screwed a counterweight 36. This counterweight is thus adjustable.

The counterweight normally retains the unit comprised of the arm 34, the tube 32 and the tray 31 in that position where the tray 31 closes off the lower end of the supply tank 17. In such a position, which is not the position shown in FIGURE 1, the tube 32 is slanted to the left, as far as it concerns the showing of FIGURE 1. The ball 33 rolls towards the left end of tube 32 or remains there. The ball weight thus lies to the left of the shaft 37 and contributes to the retaining of the tray 31 against the lower end of the supply tank 17.

When, due to rotating of the worm, the potatoes to be cooked reach the tray 31, the weight of the fried potatoes will force the tray 31 downwards and, when such weight is heavy enough, it will swing the tray with the shaft 37 thereof in the supports 29. As soon as the tray 31 begins to rock, the tube 32 also slants towards the other side, that is to the right, as shown in FIGURE 1. The ball 33 thus rolls to the right and comes to lie on the other side relative to the shaft 37, in such a way that the ball contributes to rock the tray. When the weight of potatoes reaching the tray is enough to cause the rocking thereof, the swinging movement will occur rather suddenly, in such a way that a well-determined amount of potatoes will slide from the tray 31 into the sieve-like basket 38. The potatoes are guided during their fall by the plate 30 which is supported by the supports 29. The plate 30, among other things prevents the potatoes from being discharged more to the right over the basket 38.

The basket 38 is connected, through the connecting part 41, to a sleeve 40 which is mounted over a shaft 39. Said shaft is fixed relative to the chamber. The skimmer may thus rock about the shaft 39. The basket 38 may in the present case move from the position shown in FIGURE 1, in which the basket 38 is inside the frying pan 6 up to that position where the basket 38 discharges the content thereof on the discharge plate 68.

The basket 38 with the potatoes to be cooked, remains in the pan 6 until said potatoes are fried. The movement of the basket 38 is caused by the motor 9.

On the shaft 43 of the motor 9 is mounted, besides a chain wheel 44 the purpose of which will be explained hereinafter, a crank 45 with a pin 46. The crank 45 thus takes part in the motor rotation. About the pin 46 is arranged a sleeve 47 provided with an arm 48. The pin 49 connects the arm 48 of the sleeve 47 to the forked end 50 of a link 51. The link 51 is comprised of two parts which are hollow and in which is screwed an intermediate part 73. The screw threads of both ends of the intermediate part 73, which are screwed in the parts of the link 51 have pitches of opposite directions, in such a way that rotating the part 73 shortens or lengthens the link 51.

The forked end 52 of the link 51 is hingedly connected to the arm 54 which forms a projection of tube 55. The tube 55 is located about the lug 42 which is supported by support 56 which is fixed to the basket 38. Rotating the shaft 43 of motor 9 imparts a rocking movement to the basket and takes the same out of the frying pan to bring it to that position in which the basket discharges the fried potatoes into the discharge funnel 68; from this position, the basket is returned in the frying pan 6. The chain wheel 44, which is fixed to the shaft 43 drives, through chain 57, a chain wheel 58 which is fixed to shaft 59. On shaft 59 is also mounted a chain wheel 60 which, through chain 61, drives a chain wheel 62 which is fixed to shaft 63. The shafts 59 and 63 are received in angle-irons 65 which are attached to the storage container 64. Inside said storage container 64 are housed the cartons by means of which the fried potatoes are served. The discharge plate 68 leads the fried potatoes towards the carton which has reached the bottom of the storage container. For each rocking movement of the basket 38, a carton comes to lie at the bottom of the storage container. The carton is brought therethrough the action of worm-screws or screw conveyors 67 which are fixed on the shafts 59 and 63 and which enter into said container through openings 69 provided in the storage container walls. During one turn of the shafts 59 and 63 provided with the worms 67, a carton is removed each time from the stock above the worm-screws and it is pushed downwards by an opposition member 74. That is, opposite edges of a carton are disposed between adjacent threads of worms 67, which rotate to force the carton downwardly. When the underside of the lowermost thread is reached, the members 74 push down the lowermost carton with a cam action, thereby separating it from the superposed cartons stacked in container 64. A plate 70 closes the storage container 64, but it is removable for putting new cartons in the container. The storage container 64 is connected by a stay 66 to the attachment batten 14.

The operation of the automatic machine is as follows. By introducing a coin in a slot provided for this purpose, which is not shown in the drawings, the motor 12 is started. Said motor 12 rotates the shaft 23 and, consequently, the shaft 21 until the worm has brought enough potatoes to be fried on the tray 31 and therefrom in the basket 38 which is located in the frying pan 6. Responsive to the rocking movement of the tray 31, the motor 12 is stopped and the motor 9 is started through the action of a timing device. The motor 9 however only starts when the basket 38 containing the potatoes to be fried has remained long enough in the frying pan. Because the motor 9 rotates, the shafts 59 and 63 and consequently also the worms 67 are rotated by the chain wheels 44, 58, 60 and 62 as well as by the chains 57 and 61.

These worm-screws bring a carton in front of the compartment in the lower part of the storage container 64. At the same time, the motor 9 imparts through the link 51 and the couplings associated thereto, said rocking movement to the basket 38, in such a way that the fried potatoes are discharged by the basket on the discharge plate 68, and therefrom into the carton which has been freed at the lower part of the storage container.

The dripping oil and, eventually, fried potatoes that might have escaped, are received during the movement of the basket 38, in the refuse receiver 7.

In the chamber have been provided openings for discharging a carton full of fried potatoes and also for introducing the coin which operates the coin-operated switch.

FIG. 8 shows a simplified circuit diagram of the invention, whose operation is as follows:

As soon as the electric current is switched in by means of switch 93, the machine becomes entirely charged and the frying pan 6 is warmed up to 190° C. At this temperature the thermostat 94 cuts off the electric current which feeds the frying pan and switches in again at a temperature of 195° C. The green signal 92 is also burning. When a coin falls into the coin checker, the same falls upon microswitch 90 which operates a relay 87 which switches in the electric current for starting the motor 12. This relay now receives its current via a contact 85 and a microswitch 84; at the same time the current of the blocking coil of the coin checker is switched off, via contact 86, so that it does not accept any more money. Thanks to the rotation of the motor 12, the fried potatoes fall on the scale 31.

As soon as the weight on the scale is sufficient, the same discharges the fried potatoes into the basket 38 and actuates by means of arm 34 the microswitch 84 which interrupts the current of relay 87 and simultaneously supplies current for switching in time relay 80, which then receives its current via contact 82; the red lamp 79 starts burning. After lapsing of the regulated time, contact 82 engages and energizes the motor 9.

The motor 9 starts turning and the basket 38 rotates via crank 45 and rod 51. When arm 75, which is mounted on eccentric 45, has performed a complete rotation, the fried potatoes have fallen on the discharge plate 68. Arm 75 actuates now a microswitch 78 which interrupts the current of relay 80 and the machine returns again to its rest position.

What is claimed is:

1. An automatic machine for selling fried foods, comprising a tray for receiving an order of food to be fried, means for feeding to said tray an order of food to be fried, means responsive to the deposite of a coin to actuate said feeding means, means mounting the tray for vertical swinging movement under the weight of an order of food to discharge food from the tray, means responsive to said vertical swinging movement to deactivate said feeding means, a basket for receiving and immersing in hot cooking oil a said order of food from said tray, supply means for containers for fried food, means responsive to operation of said machine to feed a single said container from said supply means, and means responsive to the expiration of a predetermined period of time after said vertical swinging movement of said tray to dump the order of fried food from said basket into the fed container.

2. A machine as claimed in claim 1, in which said food-feeding means comprises a supply compartment, and a rotatable screw conveyor for discharging food from said supply compartment, said deactivating means stopping the rotate of said screw conveyor.

3. A machine as claimed in claim 2, in which said screw conveyor rotates about a vertical axis.

4. A machine as claimed in claim 2, in which at least the lower end of said supply compartment is funnel-shaped and coaxial with the screw conveyor.

5. A machine as claimed in claim 1, and weight means movable on and relative to the tray along a path transverse to the axis of vertical swinging movement of the tray and having a rest position at one end of said path when the tray is swung up to receive food and another rest position at the other end of said path when the tray is swung down to discharge food whereby downward vertical swinging movement of said tray is accelerated by movement of said weight means to said other end of said path.

6. A machine as claimed in claim 5, in which said weight means is a ball that rolls along said path.

7. A machine as claimed in claim 1, and means mounting said basket for vertical swinging movement from a lowered position in which the basket immerses the food in the hot cooking oil to a raised position in which the basket dumps the food into the fed container.

8. A machine as claimed in claim 1, said container feed means comprising at least one screw conveyor rotatable about a vertical axis whereby at least one turn of the screw will pass between two superposed food containers.

9. A machine as claimed in claim 8, said container feed means comprising a pair of opposed screw conveyors that engage opposite sides of the food containers.

References Cited

UNITED STATES PATENTS

| 1,610,564 | 12/1926 | McLaughlin | 99—407 |
| 2,113,091 | 4/1938 | Mills | 99—407 XR |
| 2,123,663 | 7/1938 | Roach | 99—407 XR |
| 2,134,088 | 10/1938 | Obdyke | 99—407 XR |
| 2,175,531 | 10/1939 | Kortum | 99—407 XR |
| 2,176,701 | 10/1939 | Brunelle | 99—407 |
| 2,283,256 | 5/1942 | Husk | 99—407 |
| 2,522,448 | 9/1950 | Husk et al. | |
| 3,274,920 | 9/1966 | Benson | 99—443 XR |
| 3,354,813 | 11/1967 | Meyer et al. | 99—336 |
| 3,357,341 | 12/1967 | Kocken et al. | 99—334 |
| 3,398,672 | 8/1968 | Hoeberigs | 99—407 |

FOREIGN PATENTS

| 565,937 | 8/1957 | Italy. |
| 321,358 | 6/1957 | Switzerland. |

BILLY J. WILHITE, *Primary Examiner.*

U.S. Cl. X.R.

99—357, 407; 177—80; 221—150